Aug. 27, 1946.  W. W. PERRIN  2,406,474
WELDING ARC STABILIZER
Filed Jan. 19, 1944
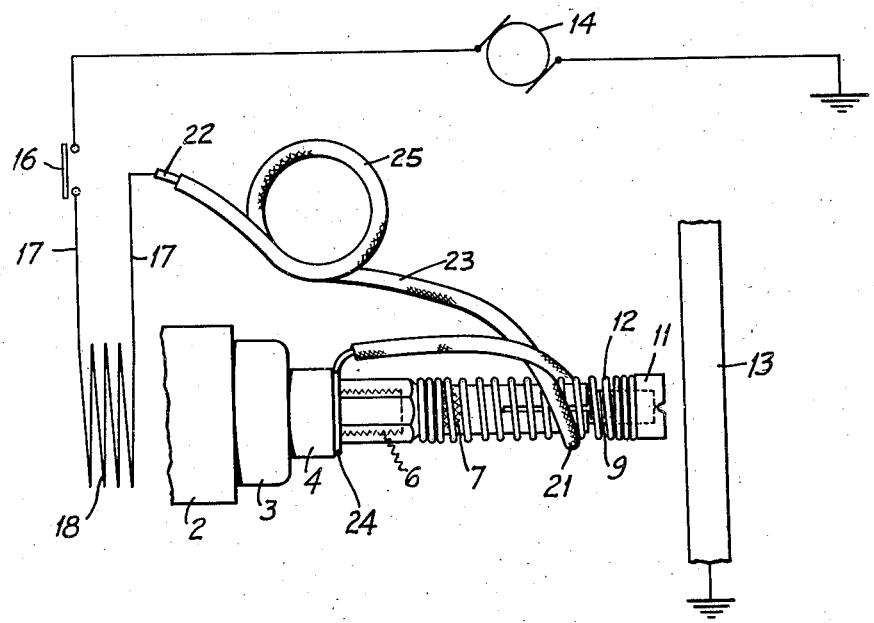
INVENTOR
William W. Perrin
BY Charles S. Evans
HIS ATTORNEY Patented Aug. 27, 1946

2,406,474

UNITED STATES PATENT OFFICE 2,406,474

WELDING ARC STABILIZER

William W. Perrin, Albany, Calif., assignor to Ted Nelson, San Leandro, Calif.

Application January 19, 1944, Serial No. 518,847

2 Claims. (Cl. 219—4)

My invention relates to the art of welding; and particularly to stud welding accomplished by an electric arc.

The principal object of my invention is to control or stabilize the arc so as to prevent magnetic blow and consequent injury to the weld by dissipation of the molten metal. Another object of the invention is the provision of a simple means, readily adapted to existing welding machines for creating the magnetic field required to accomplish the purpose in view.

My invention possesses other objects and features of value, some of which with the foregoing will be set forth in the following description of the invention. It is to be understood that I do not limit myself to the showing made by the said description and the drawing as I may adopt variant forms of the invention within the scope of the appended claims.

Referring to the drawing:

The figure is a side elevation, partly in diagram, showing the end of a welding machine including the chuck spindle and chuck, and upon which the arc stabilizer of my invention has been installed.

In broad terms, the arc stabilizer or controller of my invention comprises at least one turn or coil of a heavy conductor arranged adjacent the location of the weld, preferably of course carried by the welding machine with which it is used, and connected to receive an electric current simultaneously with the formation of the welding arc, so that a powerful magnetic flux or field is generated about the arc. Preferably too, the coil of the stabilizer is connected in series with the conductor carrying the welding current. When the parts are arranged as shown in the drawing, the chuck and stud become the core of the magnetic field which neutralizes the effect of the directional magnetic field set up by the welding current alone; and tends to control the arc by confining it closely to the location of the desired weld. This tends to eliminate the spattering of the molten metal so that it forms a fillet around the base of the stud.

In greater detail the arc stabilizer of my invention may be made up and applied to an already existing welding machine 2, one end of which is shown in the drawing. Projecting from the end of the welding machine is the reciprocating plunger 3 which carries the chuck spindle 4 provided with the threaded nipple 6 upon which the chuck 7 is held. In the chuck jaws 8 the stud 9 is held; and a ferrule 11 is held in position on the end of the stud by the spring 12. The stud is shown spaced from the plate 13 to which it is to be welded. The welding current is supplied by the generator 14 connected through the switch 16 in the conductor 17 to the solenoid 18 for operating the plunger 3. The foregoing is all in accordance with known practice and is not the subject of my present invention. For this reason the mechanism of the welding machine and the electric controls for it and the welding current circuit are not shown in detail or described.

The arc stabilizer of my invention comprises one or more turns or coils 21 of a heavy conductor 22, which conveniently may be a number three or four gauge copper wire heavily insulated with a covering 23 and so shaped that one end 24 may be looped into a tight eye and caught on the nipple 6 between the chuck spindle and the head of the chuck. From this point the conductor extends toward the stud where it makes a complete coil or turn 21 around the end of the chuck or around the stud, then returns through the loop 25 to a point where it is connected to the conductor 17. Since the chuck moves actually a short distance with respect to the welding machine, the loop 25 is provided to give flexibility to the connection.

When the welding machine has been adjusted and a stud and ferrule are in place ready for a weld, operation of the controls closes the welding circuit and the welding current flows through the conductor 17, the conductor 22, through the loop 21 and into the head of the chuck, then down through the chuck and stud to the plate 13. The chuck and stud thus form the core of the magnetic field induced by the flow of current through the coil, surrounding the location of the weld with a strong flux or field with the stabilizing effect explained.

I claim:

1. In an electric welding machine an electrode-carrying chuck, an electric conductor connected in series with the chuck and coiled therearound adjacent the electrode, and means for supplying an electric current to the conductor.

2. In an electric welding machine having an electrode-carrying chuck moved by a solenoid energized by the welding current, an electric conductor in series with the solenoid and chuck and having a coil about the electrode, said coil being fixed on and supported by the chuck.

WILLIAM W. PERRIN.